(12) United States Patent
Lin

(10) Patent No.: US 10,051,056 B2
(45) Date of Patent: Aug. 14, 2018

(54) RESOURCE PLANNING METHOD, SYSTEM, AND APPARATUS FOR CLUSTER COMPUTING ARCHITECTURE

(71) Applicant: Wistron Corporation, New Taipei (TW)

(72) Inventor: Chih-Chung Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 237 days.

(21) Appl. No.: 15/140,482

(22) Filed: Apr. 28, 2016

(65) Prior Publication Data

US 2017/0134304 A1 May 11, 2017

(30) Foreign Application Priority Data

Nov. 9, 2015 (TW) .............................. 104136797 A

(51) Int. Cl.
*H04L 29/08* (2006.01)
*G06F 9/00* (2006.01)
*G06F 9/46* (2006.01)

(52) U.S. Cl.
CPC ............ *H04L 67/1097* (2013.01); *G06F 9/00* (2013.01); *G06F 9/46* (2013.01)

(58) Field of Classification Search
CPC .................................................. H04L 67/1097
USPC .......................................................... 709/226
See application file for complete search history.

(56) References Cited

U.S. PATENT DOCUMENTS 6,161,097 A * 12/2000 Glass ................... G06Q 10/025
342/23
2016/0316003 A1* 10/2016 Snider ................. H04L 67/1002

FOREIGN PATENT DOCUMENTS

CN          104298550          1/2015

* cited by examiner

*Primary Examiner* — Adnan M Mirza
(74) *Attorney, Agent, or Firm* — JCIPRNET

(57) ABSTRACT

A resource planning method, system, and apparatus for a cluster computing architecture are provided. The resource planning apparatus establishes at least one training model based on a training platform and corresponding setting values and algorithm features, such that a master node apparatus operates based on each training model to obtain operating time, and the corresponding operating time of each training model is stored in a proposal database. Afterwards, a proposal is obtained from the proposal database according to a task condition and an expected total work time, such that the master node apparatus decides a resource allocation of the cluster computing architecture.

15 Claims, 2 Drawing Sheets

RESOURCE PLANNING METHOD, SYSTEM, AND APPARATUS FOR CLUSTER COMPUTING ARCHITECTURE

CROSS-REFERENCE TO RELATED APPLICATION

This application claims the priority benefit of Taiwan application serial no. 104136797, filed on Nov. 9, 2015. The entirety of the above-mentioned patent application is hereby incorporated by reference herein and made a part of this specification.

BACKGROUND OF THE INVENTION

1. Field of the Invention

The invention relates to a resource planning mechanism, and particularly relates to a resource planning method, a resource planning system, and a resource planning apparatus for a cluster computing architecture.

2. Description of Related Art

In the era of big data, how to store, process, and analyze megadata has become issue that the industry needs to solve. Currently, the megadata are commonly processed through a cluster computing architecture, so as to solve the issue of expanding the storage space and improve the computing capability. The conventional platforms for the cluster computing architecture, such as the Spark platform and the Hadoop platform, are normally operated based on a resource allocation according to the priority setting and weighting of tasks under a hardware resource limitation set by the user. However, currently, the user can only provide as much as possible hardware resources for the Spark platform or the Hadoop platform to allocate, and there is no proposed solution for the user to follow.

SUMMARY OF THE INVENTION

The invention provides a resource planning method, a resource planning system, and a resource planning apparatus for a cluster computing architecture capable of providing a desirable resource plan in real time.

A resource planning method for a cluster computing architecture according to an embodiment of the invention includes providing a resource planning apparatus to set up a proposal database in a master node apparatus. The proposal database stores information for deploying the cluster computing architecture. The steps of setting up the proposal database in the master node apparatus by the resource planning apparatus includes: based on a training platform, capturing at least one setting value from a setting file corresponding to the training platform and capturing at least one algorithm feature used by the training platform, wherein the training platform is one of a plurality of software frameworks; based on the setting value and the algorithm feature, establishing at least one training model and transmitting the training model to the master node apparatus, such that the master node apparatus operates based on each training model to obtain operating time; and receiving the operating time from the master node apparatus and transmitting the operating time corresponding to each training model to the proposal database. Then, based on a task condition and an expected total work time that are selected, a proposal is obtained from the proposal database by the resource planning apparatus and the proposal is transmitted to the master node apparatus, such that the master node apparatus decides a resource allocation of the cluster computing architecture based on the proposal.

According to an embodiment of the invention, the resource planning method further includes: the resource planning apparatus is connected to the master node apparatus through a network, so as to access a factor database and an algorithm database in the master node apparatus, wherein the factor database stores the setting file of each of the software frameworks, and the algorithm database stores a plurality of algorithm features.

According to an embodiment of the invention, the setting value includes one of the number of worker nodes, a worker node resource allocation, the number of data entries under analysis, and an environment parameter or a combination thereof. The algorithm feature includes one of an algorithm, the number of tasks, and the number of decomposed tasks or a combination thereof. The task condition includes one of the number of data entries under analysis, one of the software frameworks, the environment parameter, the algorithm, the number of tasks, and the number of decomposed tasks or a combination thereof The setting value may be a numerical interval.

According to an embodiment of the invention, the resource planning method further includes: after selecting the task condition and the expected total work time, if the proposal database does not have the corresponding proposal, the resource planning apparatus perform is training again for the number of worker nodes and a worker node resource allocation based on the selected task condition, obtains the corresponding operating time from the master node apparatus, and stores the operating time to the proposal database.

According to an embodiment of the invention, the resource planning method further includes: the master node apparatus performs a plurality of operations based on each training model and uses an average of time of the operations as the corresponding operating time.

According to an embodiment, the step of transmitting the proposal to the master node apparatus, such that the master node apparatus decides the resource allocation of the cluster computing architecture based on the proposal further includes: determining whether the number of worker nodes in the cluster computing architecture is less than a suggested number in the proposal and determining whether a worker node hardware resource included in the cluster computing architecture is lower than a resource requirement included in the proposal by the master node apparatus. The master node apparatus sends a notification message when it is determined that the number of worker nodes is less than the suggested number or the worker node hardware resource is lower than the resource requirement, so as to assign at least one worker node apparatus that meets the proposal to the cluster computing architecture based on a command. When it is determined that the number of worker nodes is not less than the suggested number and the worker node hardware resource is not lower than the resource requirement, the resource allocation of each of the at least one worker node apparatus that meets the suggested number is deployed by the master node apparatus.

A resource planning system according to an embodiment of the invention includes a master node apparatus and a resource planning apparatus. The master node apparatus deploy a resource allocation of a plurality of worker node apparatuses of a cluster computing architecture. The resource planning apparatus communicates with the master node apparatus through a network, and the resource planning apparatus includes a controller. Based on the training platform, the controller captures at least one setting value from a setting file corresponding to a training platform and captures at least one algorithm feature used by the training platform. The training platform is one of a plurality of software frameworks. Based on the setting value and the algorithm feature, the controller establishes at least one training model and transmits the training model to the master node apparatus, such that the master node apparatus operates based on each training model and obtains operating time. The controller receives the operating time from the master node apparatus and stores the operating time corresponding to each training model to a proposal database. Based on a task condition and an expected total work time that are selected, the controller obtains a proposal from the proposal database and transmits the proposal to the master node apparatus, such that the master node apparatus decides a resource allocation of the cluster computing architecture based on the proposal.

A resource planning apparatus according to an embodiment of the invention includes a storage unit and a controller. The storage unit includes a factor database, an algorithm database, and a proposal database. The factor database stores respective setting files of a plurality of software frameworks. The algorithm database stores at least one algorithm feature. The controller is coupled to the storage unit and deploys a resource allocation of a plurality of worker node apparatuses of a cluster computing architecture. Based on a training platform selected from the software frameworks, the controller captures at least one setting value from the setting file of the training platform, captures at least one algorithm feature used by the training platform, sets up at least one training model based on the setting value and the algorithm feature, operates based on each training model, and operating time corresponding to each training model is obtained and stored to the proposal database. The controller obtains a proposal from the proposal database based on a task condition and an expected total work time that are selected, and the controller decides the resource allocation of the cluster computing architecture based on the proposal.

Based on above, the cluster computing architecture is trained by the resource planning apparatus, so as to provide the desirable resource plan in real time.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
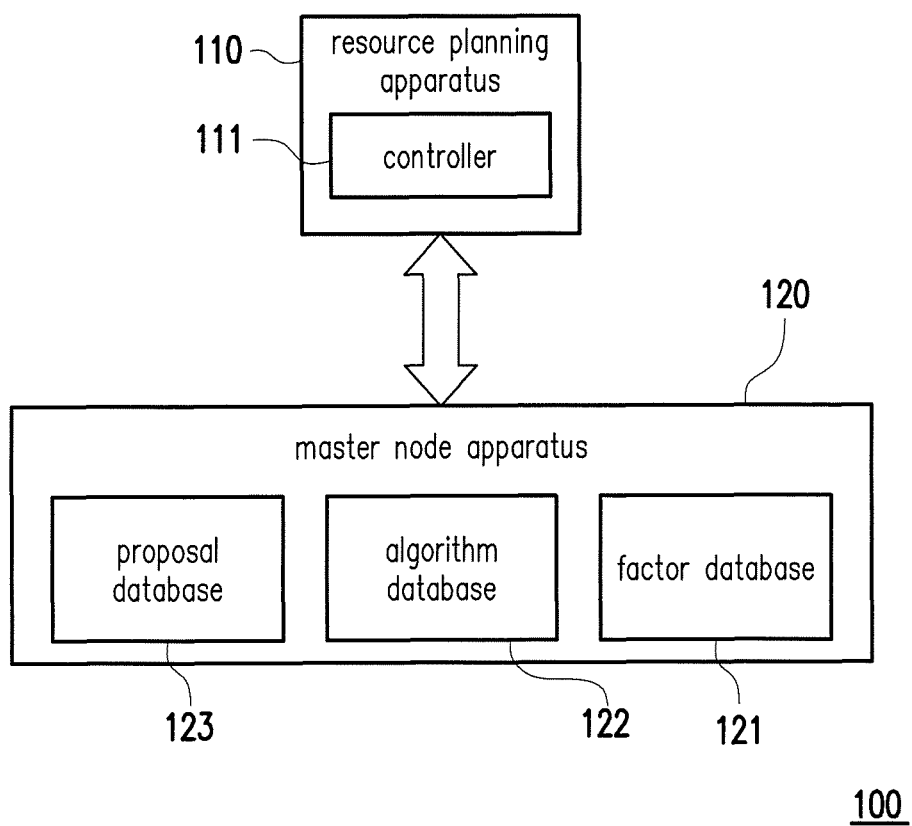
FIG. 1 is a block diagram illustrating a resource planning system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating a resource planning system according to an embodiment of the invention. Referring to FIG. 1, a resource planning system 100 includes a resource planning apparatus 110 and a master node apparatus 120.

The resource planning apparatus 110 is an electronic apparatus having a computing capability, such as a server, a personal computer, a notebook computer, a tablet computer, a smartphone, etc. The resource planning apparatus 110 includes a controller 111. The controller 111 is a central processing unit (CPU), a programmable microprocessor, an embedded control chip, a digital signal processor (DSP), an application specific integrated circuit (ASIC), or other similar apparatuses, for example.

Also, the resource planning apparatus 110 also has a storage unit (such as a memory or firmware chip) to store one or more programming code segments. After being installed, the programming code segment is executed by the controller 111, so as to carry out a resource planning method for a cluster computing architecture.

The cluster computing architecture is an architecture that adopts a software framework such as Hadoop, Spark, Storm, etc. A host (or a sever) in the cluster computing architecture is referred to as a node, and a task may be assigned to different nodes to improve a computing capability. For example, a task is decomposed and processed separately, and then results are combined. In the cluster computing architecture, the nodes may be divided into the master node apparatus 120 and a worker node apparatus according to the purpose. The master node 120 serves to deploy a resource allocation of the worker node apparatus in the cluster computing architecture, and assigns the task to the worker node apparatus. The worker node apparatus serves to carry out the task.

Thus, the number of the worker node apparatuses in the cluster computing architecture may be 0 or an integer greater than 0. If the master node apparatus 120 determines that the number of the worker node apparatuses is not enough or the hardware resources of the worker node apparatuses are too low, the master node apparatus 120 may send a notification message to notify the user to add another worker node apparatus or replace the worker node apparatus having a low hardware resource with a worker node apparatus having a high hardware resource.

Thus, a factor database 121 and an algorithm database 122 are built in the master node apparatus 120. A proposal database 123 serves to store information for deploying the cluster computing architecture, and is set up by the resource planning apparatus 110. Namely, the resource planning apparatus 110 communicates with the master node apparatus 120 through a network, so as to capture required information from the factor database 121 and the algorithm database 122 to set up the proposal database 123. When setting up the proposal database 123, a proposal stored in the proposal database 123 may be associated with corresponding data in the factor database 121 and the algorithm database 122.

In the resource planning apparatus 110, the controller 111 selects one of a plurality of software frameworks as a training platform and establishes a plurality of training models to train the training platform, so as to establish the proposal database 123 in the master node apparatus 120. In the following, details of steps of a resource planning method are described with reference to the resource planning system 100.

Figure 2:
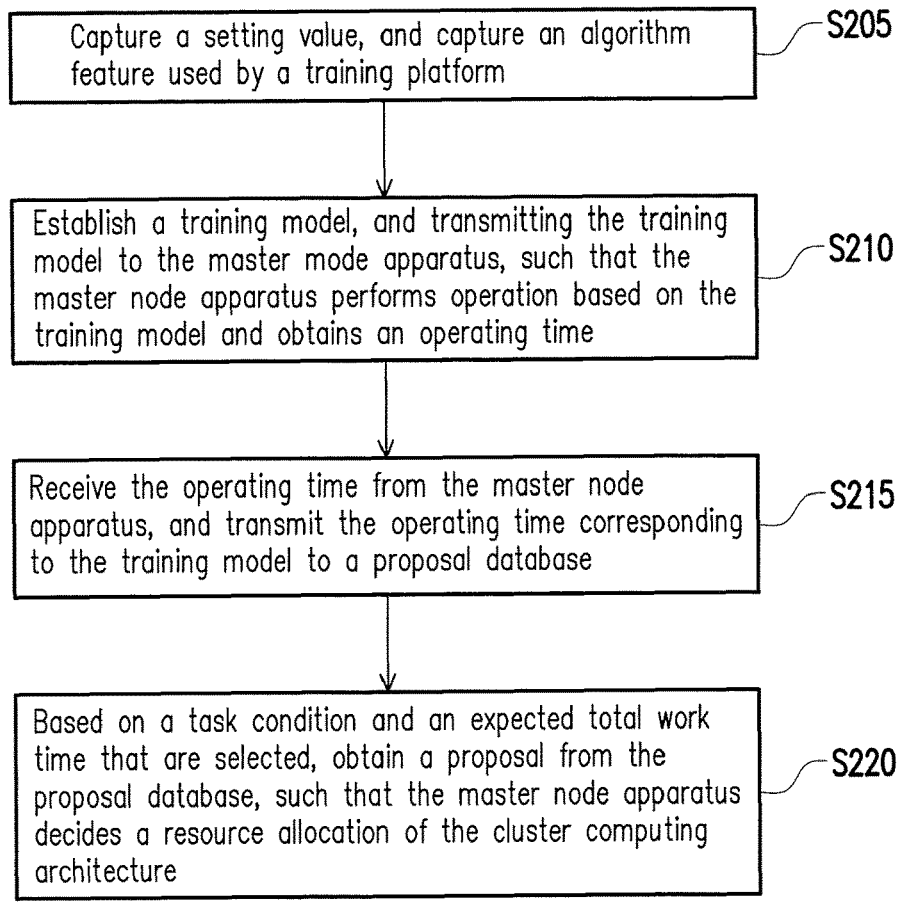
FIG. 2 is a flowchart illustrating a resource planning method for a cluster computing architecture according to an embodiment of the invention.

FIG. 2 is a flowchart illustrating a resource planning method for a cluster computing architecture according to an embodiment of the invention. Referring to FIGS. 1 and 2 at the same time, at Step S205, the controller 111 captures one or more setting values that influence an execution speed of the training platform and one or more algorithm features used by the training platform from a setting file corresponding to the training platform based on the training platform. Herein, the controller 111 may choose one of a plurality of software frames (e.g., Hadoop platform, Spark platform, Storm platform, etc.) as the training platform.

Specifically, after selecting the training platform, the controller 111 is connected with the master node apparatus 120 through a communication unit, so as to access the factor database 121 to obtain the setting values such as the number of the worker nodes, a worker node resource allocation (including the number of cores of the CPU and a memory space of each worker node), the number of data entries under analysis, and an environment parameter corresponding to the training platform. The environment parameter includes a computing model being used and a specific parameter, etc. The computing model includes parallel operation or distributed operation, for example. Different computing models require different operation time. The specific parameter includes the number of executors, whether "spark.dynamicAllocation" is enabled, whether "shuffle" is activated, and whether "heartbeat" is timeout, etc.

In addition, the controller 111 accesses the algorithm database 122 to obtain an algorithm (e.g., the k-nearest neighbors (KNN) algorithm) used by the training platform and obtain the number of tasks and the number of decomposed tasks performed with the algorithm.

Subsequently, in Step S210, the controller 111 establishes one or more training models based on the obtained setting value and the algorithm feature and transmits the one or more training models to the master node apparatus 120, such that the master node apparatus 120 may operate based on the each training model to obtain operating time. For example, the controller 111 may automatically generate the training model based on the obtained setting value and the algorithm feature, or the user may make a choice on the setting value and the algorithm feature to generate the training model. In addition, the controller 111 may also generate the training model based on a specific condition. For example, a numerical range, such as 1 to 5, may be set for the number of worker nodes. Accordingly, the controller 111 may keep other setting values and algorithm features the same and vary the number of worker node from 1 to 5, respectively, so as to respectively set up the training models. Thus, the operating time corresponding to different numbers of worker nodes in the same environment may be obtained.

Furthermore, a numerical range may be set based on the hardware resource each worker node apparatus is able to use. For example, assuming that the number of CPUs that each worker node apparatus is able to use is 6, the controller 111 may obtain the respective operating time required for the master node apparatus 120 to perform an operation in the situation of using a different number of CPU(s) when each worker node apparatus has 1 to 6 CPUs to use.

After the controller 111 transmits the training model (including the number of worker nodes, the worker node resource allocation, the number of data entries under analysis, the environment parameter, the algorithm, the number of tasks, and the number of decomposed tasks) to the master node apparatus 120, the master node apparatus 120 determines the resource allocation of the cluster computing architecture based on the training model and carries out accordingly to obtain the corresponding operating time. In addition, the master node apparatus 120 may carry out a plurality of operations based on the each training model and use an average of time obtained in the operations as the corresponding operating time. The master node apparatus 120 may perform the operation based on the training model when idling.

The master node apparatus 120 may also set up the proposal database 123 through machine learning. For example, based on the setting file of each training platform (e.g., the Hadoop platform, the Spark platform, the Storm platform, etc.), the master node apparatus 120 may clarify factors that influences the time of analyzing megadata, such as whether the operation is distributed, whether the MapReduce framework is used, a memory space and a CPU usage taken up by each executor, and the number of executors carrying out the operation for each task, etc., sorts and arranges parameters and columns of these setting files, and sets a reference value for keeping track of learning of each interval. Then, compared with the training model, i.e., the number of worker nodes, the worker node resource allocation (including the memory space, the number of CPUs, etc.,), the algorithm used, the environment parameter, the data entries under analysis, the number of tasks, and the number of decomposed tasks, that is received in correspondence with the reference value, then, compared with the total time of analysis and inferring through machine learning using the, a look-up table may be generated.

When allocating the hardware resources, the user may refer to the look-up table to find out a proposal with a suitable resource allocation according to the algorithm to be used, the size of data, and the desired complete time (i.e., expected total work time).

Moreover, the master node apparatus 120 may also obtain the respective operating time of six operations where the number of CPUs of the worker node apparatus is from 1 to 6 under the current system environment setting, and record the current system environment setting, the number of CPUs, and the corresponding operating time in the proposal database 123.

Then, at Step S215, the controller 111 receives the operating time from the master node apparatus 120 and transmits the operating time corresponding to the training model to the proposal database 123. The operating time in the proposal database 123 is associated with the corresponding data in the factor database 121 and the algorithm database 122. For example, the controller 111 may set up an association between the operating time and all conditions included in the corresponding training model (including the environment parameter in the factor database 121 and the algorithm feature in the algorithm database 122).

After setting up the proposal database 123, at Step S220, the controller 111 obtains the corresponding proposal from the proposal database 123 according to a task condition and the expected total work time that are selected, and transmits the proposal to the master node apparatus 120, such that the master node apparatus 120 deploys the resource allocation of the cluster computing architecture based on the proposal. Namely, the task condition includes one of the software framework to be used, the number of data entries under analysis, the environment parameter, the algorithm, the number of tasks, and the number of decomposed tasks or a combination thereof, and the obtained proposal includes the number of worker nodes (the number of worker node apparatuses) and the worker node resource allocation (resource allocation of the worker node apparatus).

In addition, after selecting the task condition and the expected total work time, if the proposal database 123 does not have any corresponding proposal, the controller 111 may perform training again. Namely, the controller 111 sets up the training model again for the number of worker nodes and the worker node resource allocation based on the selected task condition and transmits the training model to the master node apparatus 120, so that the master node apparatus 120 performs an operation based on each training model and obtains the corresponding operating time. The master node apparatus 120 also stores the training model and the operating time to the proposal database 123.

After the task condition and the expected total work time are selected, if the proposal database 123 does not have the corresponding proposal, the controller 111 may further send a notification message notifying the user that the proposal database 123 does not have the corresponding proposal. Besides, the controller 111 may retrieve a similar proposal and obtain a predicted proposal through inference. For example, if the number of data entries under analysis in the task condition is 10000, and there is only a proposal whose task condition matches elsewhere except that the number of data entries under analysis thereof is 5000, the controller 111 may retrieve the proposal and obtain the predicted proposal through suitable inference. For example, the proposal with 5000 data entries under analysis has two worker node apparatuses, so the predicted proposal with 10000 data entries under analysis may have four worker node apparatuses. Here, it should be understood that the above merely serves as an example, and shall not be construed as a limitation on the invention.

Based on the embodiment, after the user sets the big data (the number of data entries under analyses), selects the software framework to be used, and inputs the expected total work time by using the resource planning apparatus 110, the controller 111 may obtain the corresponding environment parameter from the factor database 121 and the corresponding algorithm feature from the algorithm database 122, so as to obtain the corresponding proposal, i.e., the number of worker nodes and the worker node resource allocation. The user may determine the resource allocation of the cluster computing architecture by using the master node apparatus 120 based on the reported number of worker nodes and the worker node resource allocation.

Specifically, the master node apparatus 120 determines whether the number of worker nodes included in the cluster computing architecture is less than the number suggested in the proposal, and determines whether the worker node hardware resources included in the cluster computing architecture is lower than a resource requirement included in the proposal.

When it is determined that the number of worker node is less than the suggested number or the worker node hardware resources are lower than the resource requirement, the master node apparatus 120 may send a notification message to notify the user that the number of worker node apparatuses in the current cluster computing architecture is not enough or the hardware resources of the worker node apparatuses in the cluster computing architecture are too low. The user may then provide another worker node apparatus and input a command to the master node apparatus 120. Then, the master node apparatus 120 additionally assigns another worker node apparatus that meets the proposal to the cluster computing architecture based on the command. When it is determined that the number of worker nodes is not less than the suggested number and the worker node hardware resources are not lower than the resource requirement, the master node apparatus 120 may deploy the resource allocation of each of the worker node apparatuses that meet the suggested number.

Figure 3:
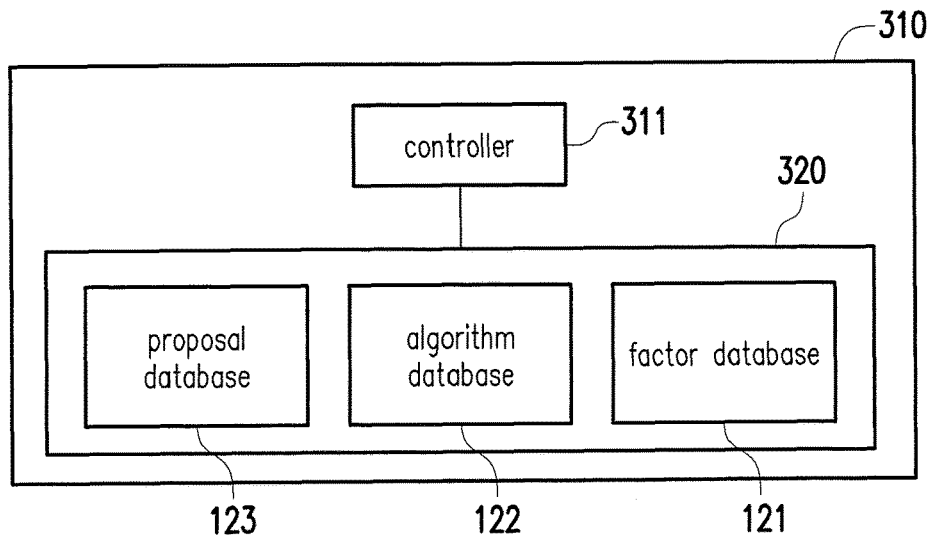
FIG. 3 is a block diagram illustrating a resource planning apparatus according to an embodiment of the invention.

Also, the resource planning apparatus 110 may be integrated with the master node apparatus 120. For example, FIG. 3 is a block diagram illustrating a resource planning apparatus according to an embodiment of the invention. Referring to FIG. 3, a resource planning apparatus 300 of this embodiment includes a controller 311 and a storage unit 320. The controller 311 includes the same function of the controller 111, and further includes the function of the master node apparatus 120, i.e., deploying the resource allocation of the worker node apparatuses in the cluster computing architecture.

The storage unit 320 includes the factor database 121, the algorithm database 122, and the proposal database 123. The controller 311 is used to select one of a plurality of software frameworks as the training platform, and a plurality of training models are established to train the training platform, so as to set up the proposal database 123.

Based on the training platform, the controller 311 captures the setting values that influence the execution speed of the training platform and captures the algorithm features used by the training platform, establishes the training models based on the setting values and the algorithm features, and operates based on the respective training models to obtain the respective operating time. Then, the operating time corresponding to each of the training models is stored in the proposal database 123. Details about setting up the proposal database 123 may be referred to Steps S205 to S215.

After the proposal database 123 is set up, the controller 311 obtains the proposal from the proposal database 123 based on the selected task condition and the expected total work time. In addition, the controller 311 deploys the resource allocation of the cluster computing architecture based on the proposal.

In view of the foregoing, according to the embodiments of the invention, the cluster computing architecture is trained, and the proposal database is set up, so that when allocating the hardware resources, the user may obtain the corresponding proposal from the proposal database, thereby obtaining a desirable resource plan in real time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A resource planning method for a cluster computing architecture, comprising:
   providing a resource planning apparatus to set up a proposal database in a master node apparatus, wherein the proposal database stores information for deploying the cluster computing architecture, and steps of setting up the proposal database by the resource planning apparatus comprises:
   based on a training platform, capturing at least one setting value from a setting file corresponding to the training platform and capturing at least one algorithm feature used by the training platform, wherein the training platform is one of a plurality of software frameworks;
   based on the at least one setting value and the at least one algorithm feature, establishing at least one training model and transmitting the at least one training model to the master node apparatus, such that the master node apparatus operates based on each of the at least one training model to obtain operating time; and receiving the operating time from the master node apparatus and transmitting the operating time corresponding to each of the at least one training model to the proposal database; and based on a task condition and an expected total work time that are selected, obtaining a proposal from the proposal database by the resource planning apparatus and transmitting the proposal to the master node apparatus, such that the master node apparatus decides a resource allocation of the cluster computing architecture based on the proposal.

2. The resource planning method for the cluster computing architecture as claimed in claim 1, further comprises:

connecting the resource planning apparatus to the master node apparatus through a network, such that the resource planning apparatus accesses a factor database and an algorithm database in the master node apparatus, wherein the factor database stores the setting file of each of the software frameworks, and the algorithm database stores the at least one algorithm feature.

3. The resource planning method for the cluster computing architecture as claimed in claim 1, wherein the at least one setting value comprises one of the number of worker nodes, a worker node resource allocation, the number of data entries under analysis, and an environment parameter or a combination thereof, and the at least one algorithm feature comprises one of an algorithm, the number of tasks, and the number of decomposed tasks or a combination thereof; and the task condition comprises one of the number of data entries under analysis, one of the software frameworks, the environment parameter, the algorithm, the number of tasks, and the number of decomposed tasks or a combination thereof.

4. The resource planning method for the cluster computing architecture as claimed in claim 1, wherein the at least one setting value is a numerical interval.

5. The resource planning method for the cluster computing architecture as claimed in claim 1, wherein after selecting the task condition and the expected total work time, if the proposal database does not have the corresponding proposal, the resource planning apparatus performs training again for the number of worker nodes and a worker node resource allocation based on the selected task condition, obtains the corresponding operating time from the master node apparatus, and stores the operating time to the proposal database.

6. The resource planning method for the cluster computing architecture as claimed in claim 1, further comprises:

performing a plurality of operations based on each of the at least one training model and using an average of time of the operations as the corresponding operating time by the master node apparatus.

7. The resource planning method for the cluster computing architecture as claimed in claim 1, wherein the step of transmitting the proposal to the master node apparatus, such that the master node apparatus decides the resource allocation of the cluster computing architecture based on the proposal further comprises:

determining whether the number of worker nodes in the cluster computing architecture is less than a suggested number in the proposal and determining whether a worker node hardware resource comprised in the cluster computing architecture is lower than a resource requirement comprised in the proposal by the master node apparatus;

sending a notification message by the master node apparatus when it is determined that the number of worker nodes is less than the suggested number or the worker node hardware resource is lower than the resource requirement, so as to assign at least one worker node apparatus that meets the proposal to the cluster computing architecture based on a command; and deploying the resource allocation of each of the at least one worker node apparatus that meets the suggested number by the master node apparatus when it is determined that the number of worker nodes is not less than the suggested number and the worker node hardware resource is not lower than the resource requirement.

8. A resource planning system, comprising:

a master node apparatus, deploying a resource allocation of a cluster computing architecture; and a resource planning apparatus, communicating with the master node apparatus through a network, wherein the resource planning apparatus comprises a controller, wherein, based on a training platform selected, the controller captures at least one setting value from a setting file corresponding to the training platform and captures at least one algorithm feature used by the training platform, the training platform being one of a plurality of software frameworks, based on the at least one setting value and the at least one algorithm feature, the controller establishes at least one training model and transmits the at least one training model to the master node apparatus, such that the master node apparatus operates based on each of the at least one training model and obtains operating time, and the controller receives the operating time from the master node apparatus and stores the operating time corresponding to each of the at least one training model to a proposal database, and based on a task condition and an expected total work time that are selected, the controller obtains a proposal from the proposal database and transmits the proposal to the master node apparatus, such that the master node apparatus decides the resource allocation of the cluster computing architecture based on the proposal.

9. The resource planning system as claimed in claim 8, wherein the master node apparatus comprises:

a factor database, storing the setting file of each of the software frameworks; and an algorithm database, storing the at least one algorithm feature.

10. The resource planning system as claimed in claim 8, wherein the at least one setting value comprises one of the number of worker nodes, a worker node resource allocation, the number of data entries under analysis, and an environment parameter or a combination thereof, and the at least one algorithm feature comprises one of an algorithm, the number of tasks, and the number of decomposed tasks or a combination thereof, and the task condition comprises one of the number of data entries under analysis, one of the software frameworks, the environment parameter, the algorithm, the number of tasks, and the number of decomposed tasks or a combination thereof.

11. The resource planning system as claimed in claim 8, wherein the at least one setting value is a numerical interval.

12. The resource planning system as claimed in claim 8, wherein after selecting one of the software frameworks, the task condition, and the expected total work time, if the proposal database does not have the corresponding proposal, the controller performs training again for the number of worker nodes and a worker node resource allocation based on the selected task condition, obtains the corresponding operating time from the master node apparatus, and stores the operating time to the proposal database.

13. The resource planning system as claimed in claim 8, wherein the master node apparatus performs a plurality of operations based on each of the at least one training model and uses an average of time of the operations as the corresponding operating time.

14. The resource planning system as claimed in claim 8, wherein after receiving the proposal, the master node apparatus determines whether the number of worker nodes in the cluster computing architecture is less than a suggested number in the proposal and determines whether a worker node hardware resource comprised in the cluster computing architecture is lower than a resource requirement comprised in the proposal, the master node apparatus sends a notification message when it is determined that the number of worker nodes is less than the suggested number or the worker node hardware resource is lower than the resource requirement, so as to assign at least one worker node apparatus that meets the proposal to the cluster computing architecture based on a command, and the master node apparatus deploys the resource allocation of each of the at least one worker node apparatus that meets the suggested number when it is determined that the number of worker nodes is not less than the suggested number and the worker node hardware resource is not lower than the resource requirement.

15. A resource planning apparatus, comprising:
a storage unit, comprising:
   a factor database, storing respective setting files of a plurality of software frameworks;
   an algorithm database, storing at least one algorithm feature; and
   a proposal database; and
a controller, coupled to the storage unit and deploying a resource allocation of a cluster computing architecture,
wherein, based on a training platform selected from the software frameworks, the controller captures at least one setting value from the setting file of the training platform, captures the at least one algorithm feature used by the training platform, establishes at least one training model based on the at least one setting value and the at least one algorithm feature, operates based on each of the at least one training model, and operating time corresponding to each of the at least one training model is obtained and then stored to the proposal database, and
the controller obtains a proposal from the proposal database based on a task condition and an expected total work time that are selected, and the controller decides the resource allocation of the cluster computing architecture based on the proposal.

\* \* \* \* \*